United States Patent
Rudisill et al.

(10) Patent No.: US 10,759,112 B2
(45) Date of Patent: *Sep. 1, 2020

(54) THREE-DIMENSIONAL PRINTING METHOD

(71) Applicant: HEWLETT-PACKARD DEVELOPMENT COMPANY, L.P., Houston, TX (US)

(72) Inventors: Stephen G. Rudisill, San Diego, CA (US); Alexey S. Kabalnov, San Diego, CA (US); Jacob Wright, San Diego, CA (US); Hector Jose Lebron, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/074,448

(22) PCT Filed: Aug. 30, 2017

(86) PCT No.: PCT/US2017/049392
§ 371 (c)(1),
(2) Date: Aug. 1, 2018

(87) PCT Pub. No.: WO2018/080631
PCT Pub. Date: May 3, 2018

(65) Prior Publication Data
US 2019/0054689 A1    Feb. 21, 2019

Related U.S. Application Data

(63) Continuation-in-part of application No. PCT/US2016/058684, filed on Oct. 25, 2016, which
(Continued)

(51) Int. Cl.
*B27N 3/02* (2006.01)
*B29C 64/165* (2017.01)
(Continued)

(52) U.S. Cl.
CPC ........ *B29C 64/165* (2017.08); *B29C 37/0025* (2013.01); *B29C 64/264* (2017.08);
(Continued)

(58) Field of Classification Search
CPC ..... B27N 3/02; B29C 37/0025; B29C 64/165; B29C 64/264; B29K 2105/251;
(Continued)

(56) References Cited

U.S. PATENT DOCUMENTS 5,204,055 A    4/1993   Sachs et al.
5,973,026 A   10/1999   Burns
(Continued)

FOREIGN PATENT DOCUMENTS

CA     2927249 A1    4/2015
CN     1857917       11/2006
(Continued)

OTHER PUBLICATIONS

Faraday, Michael. "X. The Bakerian Lecture.—Experimental relations of gold (and other metals) to light," Philosophical Transactions of the Royal Society of London 147 (1857): 145-181.
(Continued)

*Primary Examiner* — Leo B Tentoni
(74) *Attorney, Agent, or Firm* — HPI Patent Department

(57) ABSTRACT

Disclosed herein is a three-dimensional printing method comprising: applying a build material; applying on, at least, a portion of the build material, a low tint fusing agent composition comprising metal oxide nanoparticles dispersed in a liquid vehicle; and exposing the build material to radiations to fuse the portion of the build material in contact with the low tint fusing agent composition in order to form a layer of a 3D object. Also disclosed herein is an article obtained according to the three-dimensional printing method described herein. Such articles comprises a core substrate
(Continued)

made of a polymeric build material that has been fused with a core fusing agent composition; a first layer, applied on the surface of the core substrate, comprising a polymeric build material fused with a low tint fusing agent composition including metal oxide nanoparticles dispersed in a liquid vehicle; and a second layer, applied over the surface of the first layer, comprising a polymeric build material fused with a colored ink composition and a core fusing agent or with a low tint fusing agent composition colored ink composition.

16 Claims, 4 Drawing Sheets

Related U.S. Application Data is a continuation-in-part of application No. PCT/US2016/058686, filed on Oct. 25, 2016.

(51) Int. Cl.
 B33Y 70/00 (2020.01)
 B33Y 10/00 (2015.01)
 C09D 11/322 (2014.01)
 C09D 11/328 (2014.01)
 B82Y 30/00 (2011.01)
 B29C 37/00 (2006.01)
 B29C 64/264 (2017.01)
 B33Y 80/00 (2015.01)
 C09D 11/324 (2014.01)
 B29K 105/00 (2006.01)
 B29K 509/00 (2006.01)
 B29K 33/04 (2006.01)

(52) U.S. Cl.
 CPC ............... *B33Y 10/00* (2014.12); *B33Y 70/00* (2014.12); *B33Y 80/00* (2014.12); *B82Y 30/00* (2013.01); *C09D 11/322* (2013.01); *C09D 11/324* (2013.01); *C09D 11/328* (2013.01); B29K 2033/04 (2013.01); B29K 2105/251 (2013.01); B29K 2509/00 (2013.01); B29K 2995/002 (2013.01)

(58) Field of Classification Search
 CPC .......... B29K 2509/00; B29K 2995/002; B33Y 10/00; B33Y 40/02; B33Y 70/10
 USPC ................ 264/245, 246, 460, 461, 462, 463
 See application file for complete search history.

(56) References Cited

U.S. PATENT DOCUMENTS

| | | | |
|---|---|---|---|
| 6,259,962 | B1 | 7/2001 | Gothait |
| 7,007,872 | B2 | 3/2006 | Yadav et al. |
| 7,708,974 | B2 | 5/2010 | Yadav |
| 7,972,426 | B2 | 7/2011 | Hinch et al. |
| 8,651,390 | B2 | 2/2014 | Hinch et al. |
| 9,234,110 | B2 | 1/2016 | Katoh et al. |
| 9,643,359 | B2 | 5/2017 | Baumann et al. |
| 2006/0083694 | A1 | 4/2006 | Kodas et al. |
| 2007/0238056 | A1 | 10/2007 | Baumann et al. |
| 2007/0241482 | A1* | 10/2007 | Giller ............... B29C 64/165 264/494 |
| 2008/0259147 | A1 | 10/2008 | Oriakhi et al. |
| 2010/0102700 | A1 | 4/2010 | Jaiswal et al. |
| 2010/0140852 | A1 | 6/2010 | Kritchman et al. |
| 2012/0225264 | A1 | 9/2012 | Villwock |
| 2013/0072615 | A1 | 3/2013 | Muro et al. |
| 2015/0298394 | A1 | 10/2015 | Sheinman |
| 2015/0307666 | A1 | 10/2015 | Kodas et al. |
| 2016/0082697 | A1 | 3/2016 | Hara et al. |
| 2016/0263829 | A1 | 9/2016 | Okamoto |

FOREIGN PATENT DOCUMENTS

| | | |
|---|---|---|
| CN | 101663366 | 3/2010 |
| CN | 101765644 | 6/2010 |
| CN | 104136555 | 11/2014 |
| CN | 105324689 | 2/2016 |
| EP | 1724110 A1 | 11/2006 |
| EP | 2997869 A1 | 3/2016 |
| EP | 2998769 A1 | 3/2016 |
| JP | 2007502713 | 2/2007 |
| JP | 2011503274 | 1/2011 |
| JP | 2014114202 | 6/2014 |
| JP | 2014527481 | 10/2014 |
| JP | 2015214682 | 12/2015 |
| KR | 10-2006-0115560 | 11/2006 |
| KR | 20060115560 | 11/2006 |
| WO | 2005047007 A2 | 5/2005 |
| WO | WO-2007114895 A2 | 10/2007 |
| WO | 2016068899 A1 | 5/2016 |
| WO | WO-2018199955 | 11/2018 |

OTHER PUBLICATIONS

Garcia, Guillermo, et al. "Dynamicaliy modulating the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences," (2014): 3240-3253.

Kanehara, Masayuki, et al. "Indium tin oxide nanoparticles with compositionally tunable surface plasmon . . . " Jrnl of the Amer Chem Society 131.49,:17736.17737, (2009).

Milligan, W, O., and R. H. Morriss, "Morphology of Colloidal Gold—A Comparative Study." Journal of the American Chemical Sodety 86.17 (1964): 3461-3467.

Usui, Hiroyuki, Takeshi Sasaki, and Naoto Koshizaki. "Optical transmittance of indium tin oxide nanoparticles prepared by laser-induced fragmentation in water." The Journal of Physical Chemistry B 110.26 (2006): 12890-12895.

Van der Zande, Bianca Mi, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", 10 pages, The Rice Institute: Houston, TX.

Dong-Chu et al., "Preparation of Nano-WO_3 by Thermal Decomposition and Study of Its Grain Characteristics and Dispersion Behavior", Fine Chemicals, Retrieved from internet—http://en.cnki.com.cn/Article_en/CJFDTOTAL-JXHG200711004.htm, 2007, 3 Pages.

Takeda etal., "Near Infrared Absorption of Tungsten Oxide Nanoparticle Dispersions", J. Am. Ceram. Soc., 90 [12] p. 4059-4061 (2007) (Year: 2007).

\* cited by examiner

THREE-DIMENSIONAL PRINTING METHOD

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often include curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
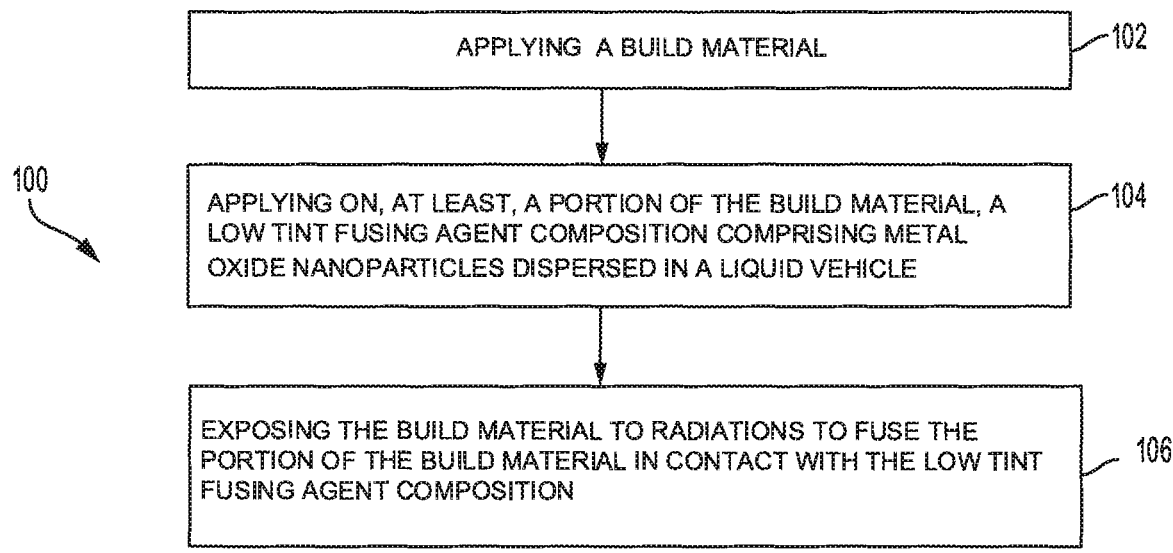
FIGS. 1 to 4 are flow diagrams illustrating examples of a 3D printing method according to the present disclosure.

The present disclosure refers herein to a three-dimensional printing method comprising: applying a build material; applying on, at least, a portion of the build material, a low tint fusing agent composition comprising metal oxide nanoparticles dispersed in a liquid vehicle; and exposing the build material to radiations to fuse the portion of the build material in contact with the low tint fusing agent composition in order to form a layer of a 3D object. The present disclosure refers also to an article obtained according to a three-dimensional printing method comprising a core substrate made of a polymeric build material that has been fused with a core fusing agent composition; a first layer, applied on the surface of the core substrate, comprising a polymeric build material fused with a low tint fusing agent composition including metal oxide nanoparticles dispersed in a liquid vehicle; and a second layer, applied over the surface of the first layer, comprising a polymeric build material fused with a colored ink composition and a core fusing agent or with a low tint fusing agent composition colored ink composition.

Examples of the three-dimensional (3D) printing method disclosed herein utilize Multi Jet Fusion (MJF) techniques. During multi jet fusion, an entire layer of a build material (also referred to as build material particles) is exposed to radiation, but a selected region (in some instances less than the entire layer) of the build material is fused and hardened to become a layer of a 3D part (or 3D object or article). A fusing agent is selectively deposited in contact with the selected region of the build material. The fusing agent is capable of penetrating into the layer of the build material and spreading onto the exterior surface of the build material. This fusing agent is capable of absorbing radiation and converting the absorbed radiation to thermal energy, which in turn melts or sinters the build material that is in contact with the core fusing agent. This causes the build material to fuse, bind, cure, etc. to form the layer of the 3D part (or 3D object or article). The fusing agents used in multi jet fusion tend to have significant absorption (e.g., 80%) in the visible region (400 nm-780 nm).

The three-dimensional printing method disclosed herein is able to use two different fusing agents: a low tint fusing agent and a core fusing agent. In some examples, the absorption of the core fusing agent (also called, in some instances, the black fusing agent) generates heat suitable for fusing during 3D printing, which leads to 3D parts having mechanical integrity and relatively uniform mechanical properties (e.g., strength, elongation at break, etc.). This absorption, however, also results in strongly colored, e.g., black, 3D parts. In some other examples, the absorption of a low tint fusing agent (also referred as LTFA) is used instead of the core fusing agent to build the entire 3D part. This example of the low tint fusing agent includes metal oxide nanoparticles. The low tint fusing agent are a plasmonic resonance absorber, having absorption at wavelengths ranging from 800 nm to 4000 nm and transparency at wavelengths ranging from 400 nm to 780 nm.

As used herein "absorption" means that at least 80% of radiation having wavelengths ranging from 800 nm to 4000 nm is absorbed. Also used herein, "transparency" means that 20% or less of radiation having wavelengths ranging from 400 nm to 780 nm is absorbed. This absorption and transparency allows the low tint fusing agent to absorb enough radiation to fuse the build material in contact therewith while causing the 3D part to be white or slightly colored.

Other examples of the method and system disclosed herein utilize a combination of different fusing agents (e.g., the core fusing agent and the low tint fusing agent) to build a part having a core (innermost layers or region) with mechanical integrity and having an exterior (outermost layers or region) with color (i.e., white or some color other than black).

3D Printing Method

As illustrated in FIG. 1, the disclosure relates to a three-dimensional (3D) printing method 100. Such method could be used in order to create 3D objects and more specifically, colored 3D objects. Such 3D object will be made of several layers. The method 100 comprises applying 102 a build material. The build material could be applied on a build area platform. Then a low tint fusing agent composition, comprising metal oxide nanoparticles dispersed in a liquid vehicle, is applied on at least, a portion of the build material 104. The low tint fusing agent composition could be applied with inkjet applicators. The build material is then exposed to radiation to fuse the portion of the build material in contact with the low tint fusing agent composition 106. Such fusing step is done to form a first layer that will be part of a final 3D object. The radiation can be electromagnetic radiation. The application of the low tint fusing agent composition can be done on several portion of the build material simultaneously and the exposed to radiations can also be done simultaneously.

Figure 2:
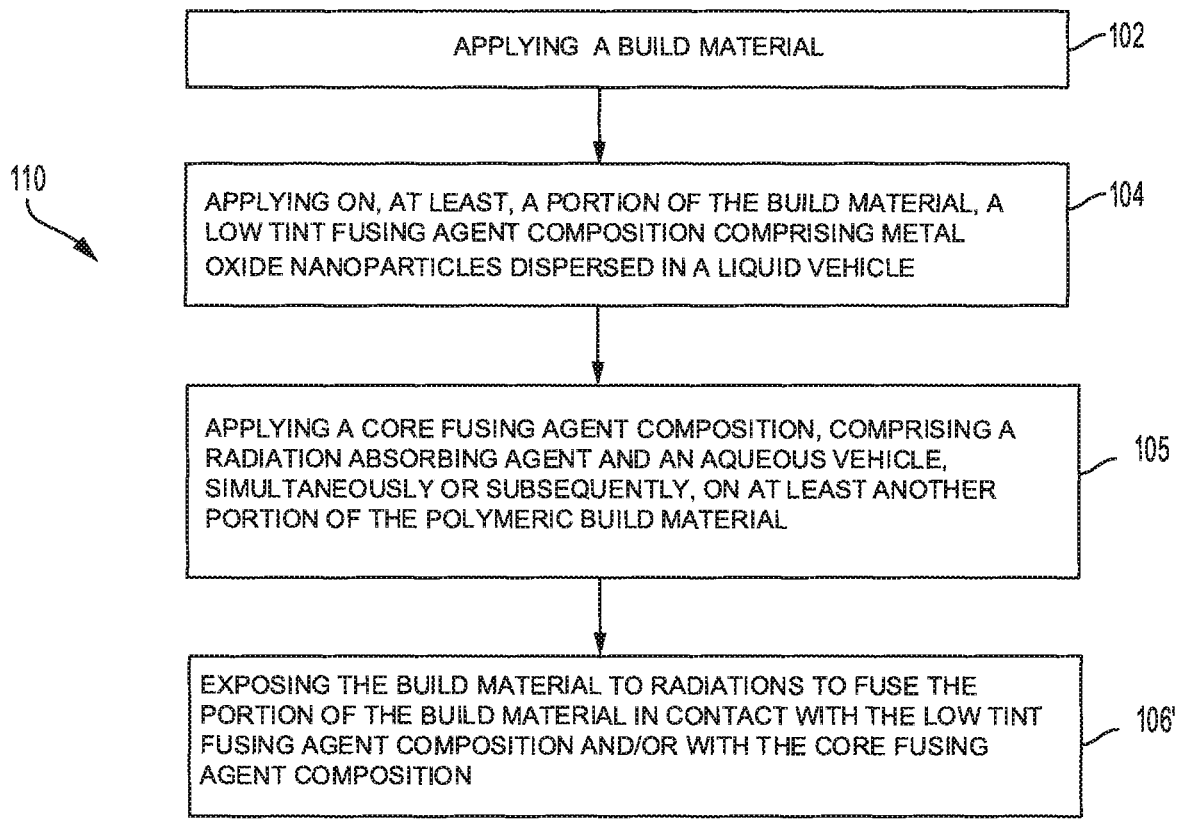

In some other examples, as illustrated in FIG. 2, the three-dimensional (3D) printing method 110 further comprises the application of a core fusing agent composition 105, comprising a radiation absorbing agent and an aqueous vehicle, simultaneously or subsequently, on at least another portion of the polymeric build material. Both the low tint fusing agent composition and the core fusing agent composition can thus be applied, in the same time, in different portion of the polymeric build material. The build material is then exposed to radiations 106' to fuse the portion of the build material in contact with the low tint fusing agent composition and/or with the core fusing agent composition.

Figure 3:
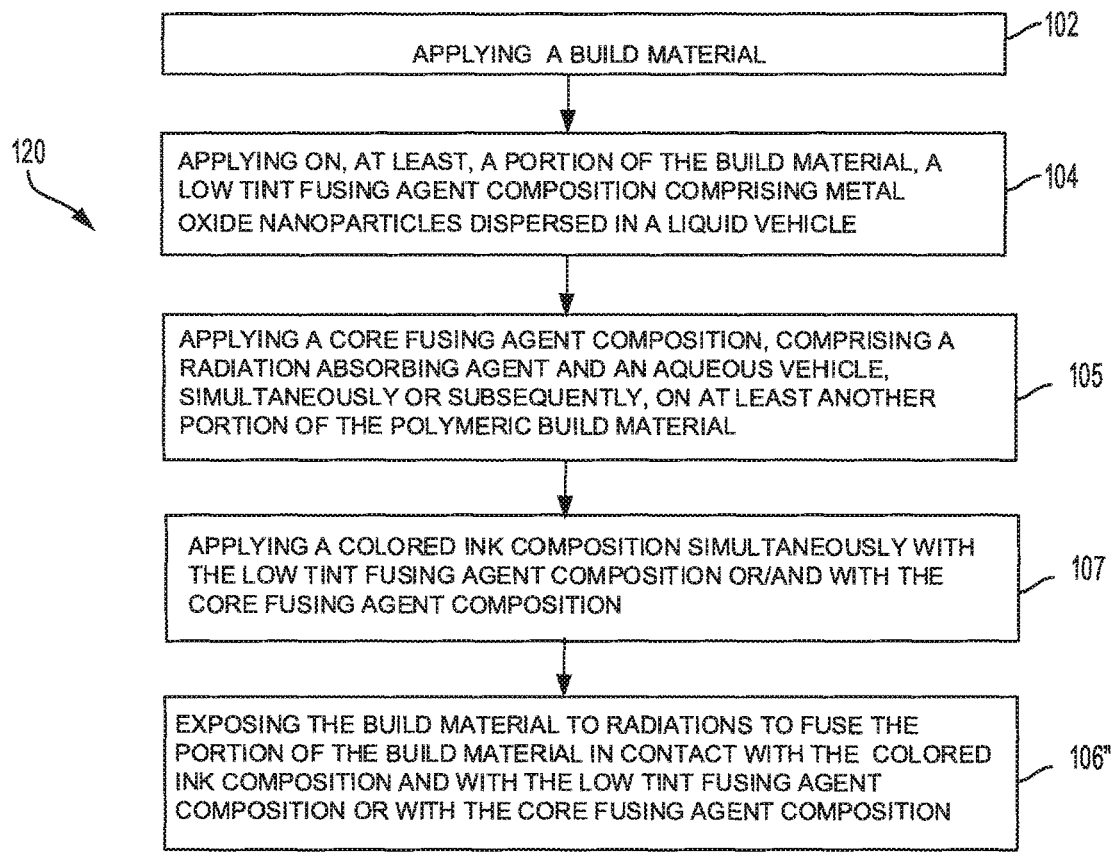

In yet some other examples, as illustrated in FIG. 3, the three-dimensional (3D) printing method 120 further comprises the application of a colored ink composition in the same time with the low tint fusing agent composition or in the same time with the core fusing agent composition on, at least, a portion of the build material layer 107; and exposing the build material layer to radiation, to fuse the portion of the build material in contact with the colored ink composition and with the low tint fusing agent composition or with the core fusing agent composition 106". In yet some other examples, the colored ink composition is applied simultaneously with the low tint fusing agent composition or in the same time on, at least, a portion of the build material layer. The build material in contact with the colored ink composition and fusing agent composition(s) (core or low tint) is then fused to form a colored layer that will be part of a final 3D object. Such colored layer will comprise the colorants of the inkjet ink embedded therein.

Figure 4:
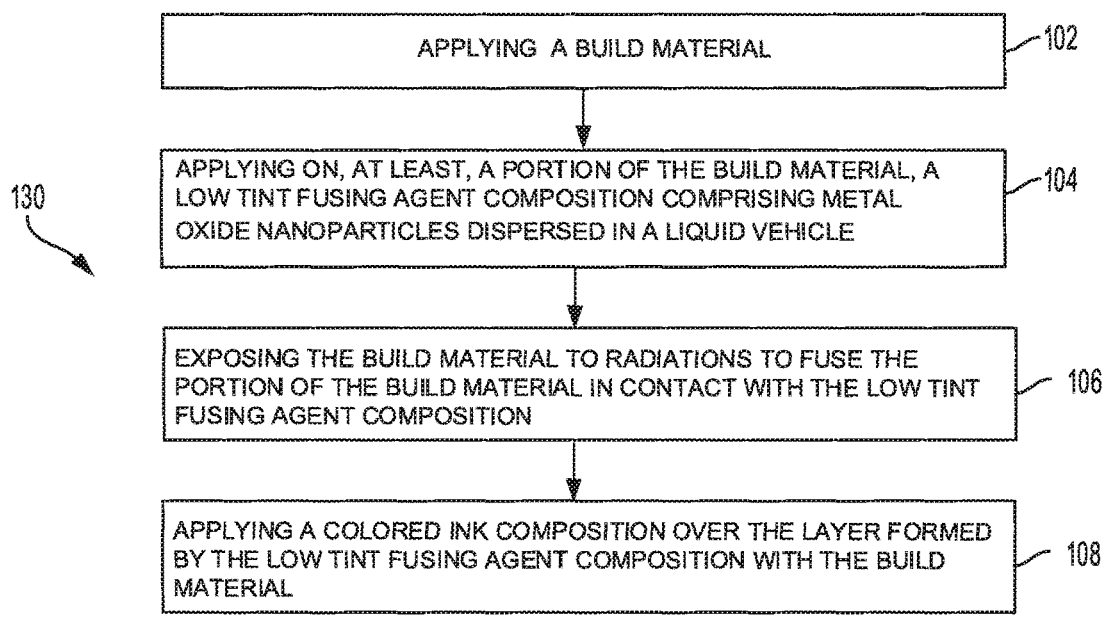

In yet further examples, as illustrated in FIG. 4, the three-dimensional (3D) printing method 130 further comprises the application of a colored ink composition over the layer formed by the low tint fusing agent composition with the build material 108. Such application of the colored ink composition will provide color to the layer formed by the fusion of portion of the build material in contact with the low tint fusing agent composition.

Within such three-dimensional (3D) printing methods, the low tint fusing agent or the core fusing agent enhances the absorption of the radiation, converts the absorbed radiation to thermal energy, and promotes the transfer of the thermal heat to the build material particles in contact therewith. In an example, the low tint fusing agent or the core fusing agent sufficiently elevates the temperature of the build material particles above the melting or softening point of the particles, allowing fusing (e.g., sintering, binding, curing, etc.) of the build material particles to take place. Exposure to electromagnetic radiation forms the layer. Such layer could be colored layer when a colored ink composition is further applied, either simultaneously with the low tint fusing agent or subsequently. It is to be understood that portions of the build material that do not have the low tint low tint fusing agent or the core low tint low tint fusing agent applied thereto do not absorb enough energy to fuse.

3D Printing System

Figure 5:
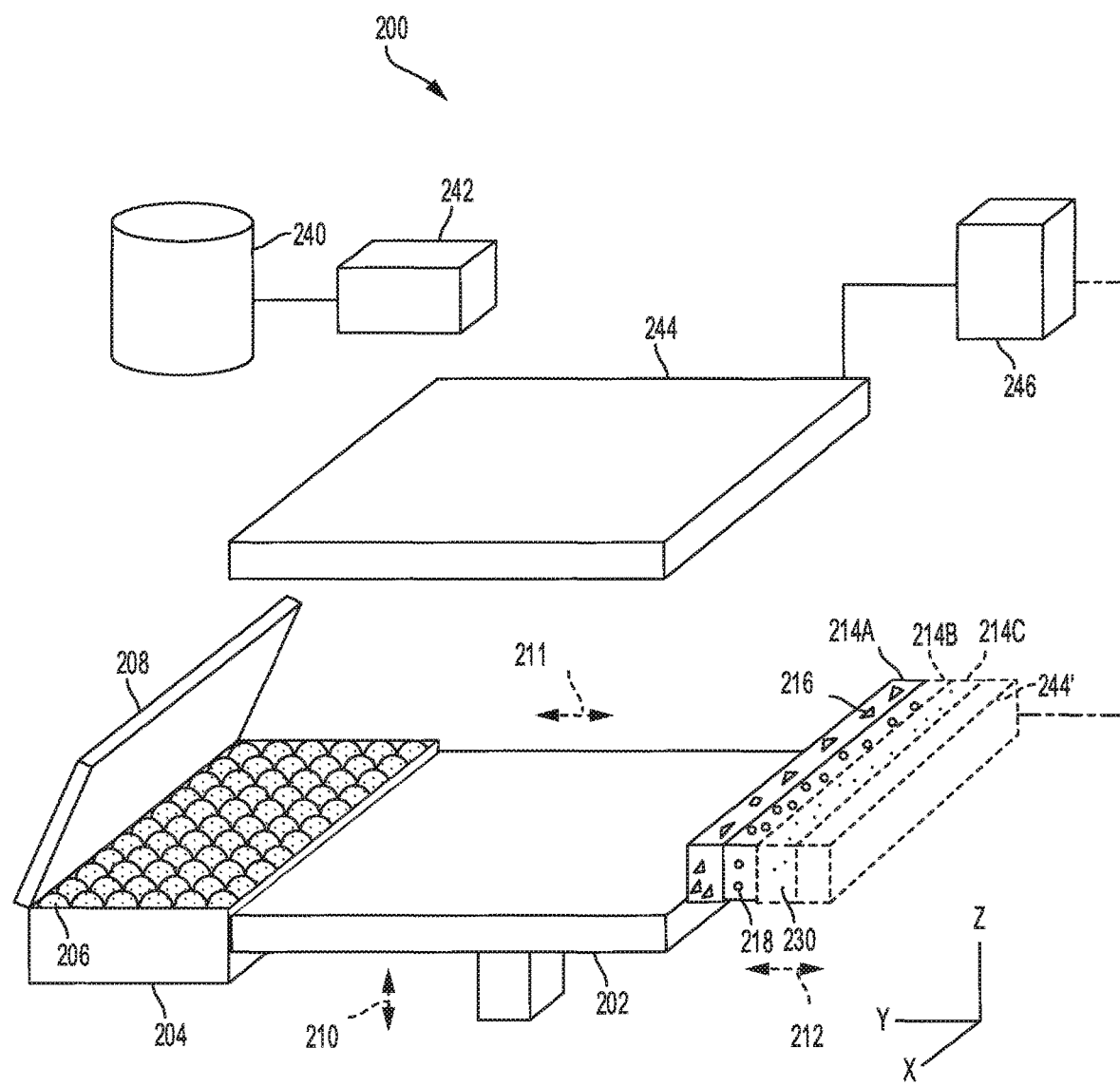
FIG. 5 is a simplified isometric view of an example of a. 3D printing system according to the present disclosure.

The three-dimensional printing method described herein is done using a three-dimensional printing system described herein. An example of a 3D printing system 200 is depicted in FIG. 5. It is to be understood that the 3D printing system 200 may include additional components and that some of the components described herein may be removed and/or modified. Furthermore, components of the 3D printing system 200 depicted in FIG. 5 may not be drawn to scale and thus, the 3D printing system 200 may have a different size and/or configuration other than as shown therein.

The printing system 200 includes a build area platform 202, a build material supply 204 containing build material particles 206, and a build material distributor 208. The build area platform 202 receives the build material particles 206 from the build material supply 204. The build area platform 202 may be integrated with the printing system 200 or may be a component that is separately insertable into the printing system 200. For example, the build area platform 202 may be a module that is available separately from the printing system 200. The build material platform 202 that is shown is also one example, and could be replaced with another support member, such as a platen, a fabrication/print bed, a glass plate, or another build surface.

The build area platform 202 may be moved in a direction as denoted by the arrow 210, e.g., along the z-axis, so that build material particles 206 may be delivered to the platform 202 or to a previously formed part layer. In an example, when the build material particles 206 are to be delivered, the build area platform 202 may be programmed to advance (e.g., downward) enough so that the build material distributor 208 can push the build material particles 206 onto the platform 202 to form a substantially uniform layer of the build material particles 206 thereon. The build area platform 202 may also be returned to its original position, for example, when a new part is to be built. The build material supply 204 may be a container, bed, or other surface that is to position the build material particles 206 between the build material distributor 208 and the build area platform 202. In some examples, the build material supply 204 may include a surface upon which the build material particles 206 may be supplied, for instance, from a build material source (not shown) located above the build material supply 204. Examples of the build material source may include a hopper, an auger conveyer, or the like. Additionally, or alternatively, the build material supply 204 may include a mechanism (e.g., a delivery piston) to provide, e.g., move, the build material particles 206 from a storage location to a position to be spread onto the build area platform 202 or onto a previously formed part layer.

The build material distributor 208 may be moved in a direction as denoted by the arrow 211, e.g., along the y-axis, over the build material supply 204 and across the build area platform 202 to spread a layer of the build material particles 206 over the build area platform 202. The build material distributor 208 may also be returned to a position adjacent to the build material supply 204 following the spreading of the build material particles 206. The build material distributor 208 may be a blade (e.g., a doctor blade), a roller, a combination of a roller and a blade, and/or any other device capable of spreading the build material particles 206 over the build area platform 202. For instance, the build material distributor 18 may be a counter-rotating roller.

As shown in FIG. 5, the printing system 200 also includes an inkjet applicator 214A, which may contain examples of the low tint fusing agent composition 216. As depicted in FIG. 200, some examples of the printing system 200 may include at least one additional inkjet applicator 214B and/or 214C. In one example, the printing system 200 includes inkjet applicator 214B, which may contain a core fusing agent composition 218, in addition to the inkjet applicator 214A. In another example, the printing system 200 includes inkjet applicator 24C, which may contain a colored ink composition 230, in addition to the inkjet applicator 24A. In still another example, the printing system 200 includes both inkjet applicators 214B and 214C in addition to the inkjet applicator 214A.

The inkjet applicator(s) 214A, 214B, 214C may be scanned across the build area platform 202 in the direction indicated by the arrow 212, e.g., along the y-axis. The inkjet applicator(s) 214A, 214B, 214C may be, for instance, a thermal inkjet printhead, a piezoelectric printhead, etc., and may extend a width of the build area platform 12. While each of the inkjet applicator(s) 214A, 214B, 214C is shown in FIG. 5 as a single applicator, it is to be understood that each of the inkjet applicator(s) 214A, 214B, 214C may include multiple inkjet applicators that span the width of the build area platform 202. Additionally, the inkjet applicator(s) 214A, 214B, 214C may be positioned in multiple printbars. The inkjet applicator(s) 214A, 214B, 214C may also be scanned along the x-axis, for instance, in configurations in which the inkjet applicator(s) 214A, 214B, 214C does/do not span the width of the build area platform 202 to enable the inkjet applicator(s) 214A, 214B, 214C to respectively deposit the fusing agent 216, the core fusing agent 218, and the colored inkjet ink 230 over a large area of a layer of build material particles 206. The inkjet applicator(s) 214A, 214B, 214C may thus be attached to a moving XY stage or a translational carriage (neither of which is shown) that moves the inkjet applicator(s) 214A, 214B, 214C adjacent to the build area platform 202 in order to deposit the respective fluids 216, 218, and 230 in predetermined areas of a layer of the build material particles 206 that has been formed on the build area platform 12 in accordance with the method(s) disclosed herein. The inkjet applicator(s) 214A, 214B, 214C may include a plurality of nozzles (not shown) through which the compositions 216, 218, and 230 are to be respectively ejected.

The inkjet applicators 214A, 214B, 214C may respectively deliver drops of the low tint fusing agent composition 216, the core fusing agent composition 218, and the colored ink composition 230 at a resolution ranging from about 300 dots per inch (DPI) to about 1200 DPI. In other examples, the applicator(s) 214A, 214B, 214C may deliver drops of the respective fluids 216, 218, and 230 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, inkjet applicators 214A, 214B, 214C are able to deliver variable size drops of the fluids 216, 218, and 230, respectively.

Each of the previously described physical elements may be operatively connected to a controller 240 of the printing system 200. The controller 240 may control the operations of the build area platform 202, the build material supply 204, the build material distributor 208, and the inkjet applicator(s) 214A, 214B, 214C. As an example, the controller 240 may control actuators (not shown) to control various operations of the 3D printing system 200 components. The controller 240 may be a computing device, a semiconductor-based microprocessor, a central processing unit (CPU), an application specific integrated circuit (ASIC), and/or another hardware device. Although not shown, the controller 240 may be connected to the 3D printing system 200 components via communication lines.

The controller 240 manipulates and transforms data, which may be represented as physical (electronic) quantities within the printer's registers and memories, in order to control the physical elements to create the 3D part. As such, the controller 240 is depicted as being in communication with a data store 242. The data store 242 may include data pertaining to a 3D part to be printed by the 3D printing system 10. The data for the selective delivery of the build material particles 206, the low tint fusing agent 216, the core fusing agent 218, the colored ink 230, etc. may be derived from a model of the 3D part to be formed. For instance, the data may include the locations on each layer of build material particles 206 that the inkjet applicator(s) 214A, 214B, 214C are to deposit the low tint fusing agent 216, the core fusing agent 218, the colored inkjet ink 230.

After the low tint fusing agent 216 or the core using agent 218 are selectively applied in the specific portion(s) of the build material 206, the entire layer of the build material is exposed to electromagnetic radiation. The electromagnetic radiation is emitted from the radiation source 244, 244. The length of time the electromagnetic radiation is applied for, or energy exposure time, may be dependent, for example, on one or more of: characteristics of the radiation source 244, 244; characteristics of the build material particles 206; and/or characteristics of the low tint fusing agent 216 or core fusing agent 218.

As shown in FIG. 5, the printing system 10 may also include a radiation source 244, 244'. In some examples, the radiation source 244 may be in a fixed position with respect to the build material platform 202. In other examples, the radiation source 244' may be positioned to expose the layer of build material particles 206 to radiation immediately after the low tint fusing agent 216 and/or the core fusing agent 218 has been applied thereto. In the example shown in FIG. 1, the radiation source 38' is attached to the side of the inkjet applicator(s) 214A, 214B, 214C, which allows for patterning and heating in a single pass. The radiation source 244, 244' may emit electromagnetic radiation having wavelengths ranging from about 800 nm to about 1 mm. As one example, the electromagnetic radiation may range from about 800 nm to about 2 μm. As another example, the electromagnetic radiation may be blackbody radiation with a maximum intensity at a wavelength of about 1100 nm. The radiation source 244, 244' may be infrared (IR) or near-infrared light sources, such as IR or near-IR curing lamps, IR or near-IR light emitting diodes (LED), or lasers with the desirable IR or near-IR electromagnetic wavelengths. The radiation source 244, 244 may be operatively connected to a lamp/laser driver, an input/output temperature controller, and temperature sensors, which are collectively shown as radiation system components 40. The radiation system components 246 may operate together to control the radiation source 244, 244'. The temperature recipe (e.g., radiation exposure rate) may be submitted to the input/output temperature controller. During heating, the temperature sensors may sense the temperature of the build material particles 206, and the temperature measurements may be transmitted to the input/output temperature controller. For example, a thermometer associated with the heated area can provide temperature feedback. The input/output temperature controller may adjust the radiation source 244, 244' power set points based on any difference between the recipe and the real-time measurements. These power set points are sent to the lamp/laser drivers, which transmit appropriate lamp/laser voltages to the radiation source 244, 244'. This is one example of the radiation system components 246, and it is to be understood that other radiation source control systems may be used. For example, the controller 240 may be configured to control the radiation source 244, 244'.

A three-dimensional printing method comprising: applying a build material 206; applying on, at least, a portion of the build material 206, a low tint fusing agent 216 composition comprising metal oxide nanoparticles dispersed in a liquid vehicle; and exposing the build material to radiations to fuse the portion of the build material in contact with the low tint fusing agent 216 composition to form a layer that would be part of a final 3D object or article.

In some examples, in the three-dimensional printing method, a core fusing agent composition, comprising a radiation absorbing agent and an aqueous vehicle, is applied, simultaneously or subsequently, on at least another portion of the polymeric build material. In some other examples, in the three-dimensional printing method, a colored ink composition is applied simultaneously with the low tint fusing agent composition or/and with the core fusing agent composition. In yet some other examples, the three-dimensional printing method further comprises applying a colored ink composition over the layer formed by the low tint fusing agent composition with the build material.

A layer of the build material particles 206 is applied on the build area platform 202. As previously described, the build material supply 204 may supply the build material particles into a position so that they are ready to be spread onto the build area platform 202, and the build material distributor 208 may spread the supplied build material particles 206 onto the build area platform 202. The controller 240 may execute control build material supply instructions to control the build material supply to appropriately position the build material particles 206, and may execute control spreader instructions to control the build material distributor 208 to spread the supplied build material particles over the build area platform to form a layer of build material particles 206. After the layer is applied, the low tint fusing agent 216 and/or the core fusing agent 218 is selectively applied on portion(s) of the build material particles 206 in the layer 94 and the entire layer of the build material particles is exposed to electromagnetic radiation. In this example, low tint fusing agent the core fusing agent 218 enhance the absorption of the radiation in portion(s), converts the absorbed radiation to thermal energy, and promotes the transfer of the thermal heat to the build material particles 206 in contact therewith. In an example, the low tint fusing agent and/or the core fusing agent 218 sufficiently elevates the temperature of the build material particles in portion above the melting or softening point of the particles 16, allowing fusing (e.g., sintering, binding, curing, etc.) of the build material particles to take place. Exposure to electromagnetic radiation forms parts of a first layer of the final 3D object or article. It is to be understood that portions of the build material that do not have any fusing agent applied thereto do not absorb enough energy to fuse.

After a layer is formed, additional layer(s) may be formed thereon to create an example of the 3D part. For example, to form other layers, additional polymeric build material may be applied on the formed layer. The fusing agent is then selectively applied on at least a portion of the additional build material particles, according to a pattern of a cross-section for the layer which is being formed. The application of additional polymeric build material particles, the selective application of the low tint fusing agent or fusing agent, and the electromagnetic radiation exposure may be repeated a predetermined number of cycles to form the layers that will create the final 3D object or article. In some examples, after a first layer is formed, the low tint fusing agent 216 and the colored ink 230 are selectively applied on some portions of the build material particles 206. The low tint fusing agent and the colored inkjet ink can be selectively applied in a pattern of a cross-section for the colored layer that is to be formed.

The Low Tint Fusing Agent Composition

The low tint fusing agent (LTFA) composition 216 is an aqueous jettable composition that includes metal oxide nanoparticles; a zwitterionic stabilizer; a surfactant; and an aqueous vehicle. The low tint fusing agent composition comprises metal oxide nanoparticle that might give the fusing agent a transparent or translucent or a light blue color. The low tint fusing agent is different from the core fusing agent, or black fusing agent, due to its chemical composition and also due to its final color. The Low Tint Fusing Agent composition 216 comprises metal oxide nanoparticles that act as a plasmonic resonance absorber. The metal oxide nanoparticles (plasmonic resonance absorber) allows the low tint fusing agent composition to absorb radiation at wavelengths ranging from 800 nm to 4000 nm, which enables the Low Tint Fusing Agent composition to convert enough radiation to thermal energy so that the build material particles fuse. The plasmonic resonance absorber also allows the low tint fusing agent composition to have transparency at wavelengths ranging from 400 nm to 780 nm, which enables the 3D par or layer form with agent to be white or slightly colored. The term "low tint" is used herein to define the fusing agent by opposition to the "core" fusing agent. The ""low tint" will provide to the parts containing it, a "low tint" color in relation with its absorption range (nearly transparency at wavelengths ranging from 400 nm to 780 nm). On the opposite, the "core" fusing agent, which may be referred to herein as the black fusing agent since its contains a radiation absorbing agent, will provide to the parts containing it, a dark color in relation with the absorption of the colorant contained in it. The colorant can be any infrared light absorbing colorant (and can be black reflecting thus a black color).

Metal Oxide Nanoparticles

The metal oxide nanoparticles are plasmonic resonance absorbers, having absorption at wavelengths ranging from 800 nm to 4000 nm and transparency at wavelengths ranging from 400 nm to 780 nm. As used herein "absorption" means that at least 80% of radiation having wavelengths ranging from 800 nm to 4000 nm is absorbed. Also used herein, "transparency" means that 20% or less of radiation having wavelengths ranging from 400 nm to 780 nm is absorbed. This absorption and transparency allows the low tint fusing agent to absorb enough radiation to fuse the build material in contact therewith while causing the 3D part to be white or slightly colored. The metal oxide nanoparticles can be considered as the low tint fusing agent per se, i.e. the specific compound that provides the specific properties to the low tint fusing agent (LTFA) composition 216.

The metal oxide nanoparticles, that are part of the low tint fusing agent composition, have the formula (1) $M_mM'O_n$ On wherein M is an alkali metal, m is greater than 0 and less than 1, M' is any metal, and n is greater than 0 and less than or equal to 4. The metal oxide nanoparticles are a dispersion in the low tint fusing agent composition. As used herein, the term "dispersion" refers to a two-phases system where one phase consists of finely divided metal oxide particle distributed throughout a bulk substance, i.e. liquid vehicle. The metal oxide nanoparticle is the dispersed or internal phase and the bulk substance is the continuous or external phase (liquid vehicle). As disclosed herein the liquid medium is an aqueous liquid medium, i.e. comprising water.

The metal oxide nanoparticles have formula (1): $M_mM'O_n$ (1) wherein M is an alkali metal, m is greater than 0 and less than 1, M' is any metal, and n is greater than 0 and less than or equal to 4. As per formula (1), M is an alkali metal, and can be lithium (Li), sodium (Na), potassium (K), rubidium (Rb), cesium (Cs), or mixtures thereof. Indeed, without being linked by any theory, it is believed that such compound possesses a satisfactory absorption of NIR light (having a wavelength between about 750 nm to about 1400 nm) while retaining a high transmittance of visible light (having a wavelength between about 380 nm to about 750 nm).

In some examples, the nanoparticles absorb infrared light in a range of from about 750 nm to about 2300 nm. In some other examples, the nanoparticles absorb infrared light in a range of from about 780 nm to about 1400 nm. In yet some other examples, the nanoparticles absorb infrared light in a range of from about 780 nm to about 2300 nm. The metal oxide nanoparticles can also absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm. The metal oxide can be an IR absorbing inorganic nanoparticle.

The metal oxide nanoparticles present in the low tint fusing agent composition, have the formula (1) $M_mM'O_n$. In the formula (1), M is an alkali metal. In some examples, M is lithium (Li), sodium (Na), potassium (K), rubidium (Rb), cesium (Cs), or mixtures thereof. In some other examples, M is cesium (Cs). In the formula (1), M' is any metal. In some examples, M' is tungsten (W), molybdenum (Mb), tantalum (Ta), hafnium (Hf), cerium (Ce), lanthanum (La), or mixtures thereof. In some other examples, M' is tungsten (W). In the formula (1), m is greater than 0 and less than 1. In some examples, m can be 0.33. In the formula (1), n is greater than 0 and less than or equal to 4. In some examples, n can be greater than 0 and less than or equal to 3. In some examples, the nanoparticles of the present disclosure have the formula (1) MmM'On, wherein M is tungsten (W), n is 3 and M is lithium (Li), sodium (Na), potassium (K), rubidium (Rb), cesium (Cs), or mixtures thereof. The nanoparticles are thus Tungsten bronzes nanoparticles having the formula $MmWO_3$.

In some other examples, the metal oxide nanoparticles are cesium tungsten nanoparticles having the formula (1) MmM'On, wherein M is cesium (Cs), m is 0.33, M' is tungsten (W), and n is greater than 0 and less than or equal to 3. In an example, the metal oxide nanoparticle is a cesium tungsten oxide nanoparticles having a general formula of $C_{sx}WO_3$, where $0<x<1$. The cesium tungsten oxide nanoparticles may give the dispersion a light blue color. The strength of the color may depend, at least in part, on the amount of the cesium tungsten oxide nanoparticles in the dispersion.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm. In a more specific example, the average particle size (e.g., volume-weighted mean diameter) of the metal oxide nanoparticles may range from about 1 nm to about 40 nm. In some examples, the average particle size of the metal oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize. In some examples, the metal oxide nanoparticles may be present in low tint fusing agent composition in an amount ranging from about 1 wt % to about 20 wt % (based on the total wt % of the low tint fusing agent composition).

Zwitterionic Stabilizer

The low tint fusing agent composition, comprising metal oxide nanoparticles, also includes the zwitterionic stabilizer. The zwitterionic stabilizer may improve the stabilization of the dispersion. While the zwitterionic stabilizer has an overall neutral charge, at least one area of the molecule has a positive charge (e.g., amino groups) and at least one other area of the molecule has a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. Then, the negative charge of the negative area of the zwitterionic stabilizer molecules may repel metal oxide nanoparticles from each other. The zwitterionic stabilizer molecules may form a protective layer around the metal oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the metal oxide nanoparticles from agglomerating and/or settling in the dispersion. Examples of suitable zwitterionic stabilizers include $C_2$ to $C_8$ betaines, $C_2$ to $C_8$ amino-carboxylic acids having a solubility of at least 10 g in 100 g of water, taurine, and combinations thereof. Examples of the $C_2$ to $C_8$ amino-carboxylic acids include beta-alanine, gamma-aminobutyric acid, glycine, and combinations thereof.

The zwitterionic stabilizer may be present, in the low tint fusing agent composition, in an amount ranging from about 2 wt % to about 35 wt % (based on the total wt % of the low tint fusing agent composition). When the zwitterionic stabilizer is the $C_2$ to $C_8$ betaine, the $C_2$ to $C_8$ betaine may be present in an amount ranging from about 8 wt % to about 35 wt % of a total wt % of the low tint fusing agent composition. When the zwitterionic stabilizer is the $C_2$ to $C_8$ amino-carboxylic acid, the $C_2$ to $C_8$ amino-carboxylic acid may be present in an amount ranging from about 2 wt % to about 20 wt % of a total wt % of the low tint fusing agent composition. When the zwitterionic stabilizer is taurine, taurine may be present in an amount ranging from about 2 wt % to about 35 wt % of a total wt % of the low tint fusing agent composition. The zwitterionic stabilizer may be added to the metal oxide nanoparticles and water before, during, or after milling of the nanoparticles in the water to form the dispersion that would be part of the low tint fusing agent composition.

In an example, the low tint fusing agent composition disclosed herein includes the metal oxide nanoparticles, the zwitterionic stabilizer, a surfactant, and a liquid vehicle. In another example, the low tint fusing agent composition includes the metal oxide nanoparticles, the zwitterionic stabilizer, a co-solvent, a surfactant, and a balance of water. In yet other examples, the low tint fusing agent composition may include additional components, such as an additive. As used herein, the terms "liquid vehicle" and "vehicle" may refer to the liquid fluid in which the metal oxide nanoparticles and the zwitterionic stabilizer are placed to form the low tint fusing agent composition. A wide variety of liquid vehicles may be used with the low tint fusing agent composition set of the present disclosure. The vehicle may include water alone or in combination with a variety of additional components. Examples of these additional components may include co-solvent, surfactant, antimicrobial agent, anti-kogation agent, and/or a chelating agent.

The liquid vehicle of the low tint fusing agent composition may also include surfactants. The surfactant may be present in an amount ranging from about 0.1 wt % to about 4 wt % (based on the total wt % of the low tint fusing agent composition). Examples of suitable surfactants are non-ionic surfactants. Some specific examples include a self-emulsifiable, nonionic wetting agent based on acetylenic diol chemistry (e.g., Surfynol® SEF from Air Products and Chemicals, Inc.), a nonionic fluorosurfactant (e.g., Capstone® fluorosurfactants from DuPont, previously known as Zonyl FSO), and combinations thereof. In other examples, the surfactant is an ethoxylated low-foam wetting agent (e.g., Surfynol® 440 or Surfynol® CT-111 from Air Products and Chemical Inc.) or an ethoxylated wetting agent and molecular defoamer (e.g., Surfynol® 420 from Air Products and Chemical Inc.). Still other suitable surfactants include non-ionic wetting agents and molecular defoamers (e.g., Surfynol® 104E from Air Products and Chemical Inc.), or water-soluble, non-ionic surfactants (e.g., Tergitol® TMN-6, Tergitol® 15S7, and Tergitol® 15S9 from The Dow Chemical Company). In some examples, an anionic surfactant may be used in combination with the non-ionic surfactant. One suitable anionic surfactant is an alkyldiphenyloxide disulfonate (e.g., Dowfax® 8390 and Dowfax® 2A1 from The Dow Chemical Company). In some examples, it may be desirable to utilize a surfactant having a hydrophilic-lipophilic balance (HLB) less than 10.

The vehicle may include co-solvent(s). Some examples of the co-solvent that may be added to the vehicle include 1-(2-hydroxyethyl)-2-pyrollidinone, 2-pyrrolidinone, 2-methyl-1,3-propanediol, 1,5-pentanedial, triethylene glycol, tetraethylene glycol, 1,6-hexanediol, tripropylene glycol methyl ether, ethoxylated glycerol-1 (LEG-1), and combinations thereof. Whether a single co-solvent is used or a combination of co-solvents is used, the total amount of co-solvent(s) in the low tint fusing agent composition may range from about 2 wt % to about 80 wt % with respect to the total wt % of the low tint fusing agent composition.

In some examples, the liquid vehicle may also include one or more additives. The additive may be an anti-kogation agent, a chelating agent, an antimicrobial agent, or a combination thereof. While the amount of the additive may vary depending upon the type of additive, generally the additive may be present in the low tint fusing agent composition in an amount ranging from about 0.01 wt % to about 20 wt % (based on the total wt % of the low tint fusing agent composition).

An anti-kogation agent may be included in the low tint fusing agent composition. Kogation refers to the deposit of dried low tint fusing agent composition components on a heating element of a thermal inkjet printhead. Anti-kogation agent(s) is/are included to assist in preventing the buildup of kogation. Examples of suitable anti-kogation agents include oleth-3-phosphate (e.g., commercially available as Crodafos® O3A or Crodafos® N-3 acid from Croda), or a combination of oleth-3-phosphate and a low molecular weight (e.g., <5,000) polyacrylic acid polymer. Whether a single anti-kogation agent is used or a combination of anti-kogation agents is used, the total amount of anti-kogation agent(s) in the low tint fusing agent composition may range from about 0.1 wt % to about 0.2 wt % (based on the total wt % of the low tint fusing agent composition).

The liquid vehicle may also include a chelating agent. The chelating agent may be included in the low tint fusing agent composition to eliminate the deleterious effects of heavy metal impurities. Examples of suitable chelating agents include disodium ethylene-di aminetetraacetic acid (EDTA-Na), ethylene diamine tetra acetic acid (EDTA), and methylglycinediacetic acid (e.g., Trilon® M from BASF Corp.). Whether a single chelating agent is used or a combination of chelating agents is used, the total amount of chelating agent(s) in the low tint fusing agent composition may range from 0 wt % to about 2 wt % based on the total wt % of the low tint fusing agent composition.

The liquid vehicle may also include antimicrobial agents. Suitable antimicrobial agents include biocides and fungicides. Example antimicrobial agents may include the Nuosept® (Ashland Inc.), Vancide® (R.T. Vanderbilt Co.), Acticide® B20 and Acticide® M20 (Thor Chemicals), and combinations thereof. In an example, the low tint fusing agent composition may include a total amount of antimicrobial agents that ranges from about 0.1 wt % to about 1 wt % (based on the total wt % of the low tint fusing agent composition). In some examples disclosed herein, the vehicle of the low tint fusing agent composition may also include additional dispersants (e.g., a low molecular weight (e.g., <5,000) polyacrylic acid polymer, such as Carbosperse® K-7028 Polyacrylate from Lubrizol), preservatives, jettability additives, and the like.

The Core Fusing Agent Composition

The core fusing agent 218 (or black fusing agent) is a jettable composition. The core or black fusing agent composition is an aqueous jettable composition that includes radiation absorbing agent an active material) and an aqueous vehicle. Examples of the core fusing agent 218 are water-based dispersions including a radiation absorbing agent (i.e., an active material). The amount of the active material in the core fusing agent may depend upon how absorbing the active material is. In an example, the core fusing agent may include the active material and may be applied in an amount sufficient to include at least 0.01 wt % of the active material in the 3D part layer that is formed with the core fusing agent. Even this low amount can produce a black colored part layer. The core fusing agents tend to have significant absorption (e.g., 80%) in the visible region (400 nm-780 nm). This absorption generates heat suitable for fusing during 3D printing, which leads to 3D parts having mechanical integrity and relatively uniform mechanical properties (e.g., strength, elongation at break, etc.). The radiation absorbing agent is a dispersion of material in the aqueous vehicle. As used herein, the term "dispersion" refers to a two-phases system where one phase consists of finely divided radiation absorbing agent distributed throughout a bulk substance, i.e. liquid vehicle. The radiation absorbing agent is the dispersed or internal phase and the bulk substance is the continuous or external phase (liquid vehicle). As disclosed herein the liquid medium is an aqueous liquid medium, i.e. comprising water.

The active material, or radiation absorbing agent, may be any infrared light absorbing colorant that is black. As such, the core fusing agent composition may be referred to herein as the black fusing agent. In an example, the active material, or radiation absorbing agent is a near infrared light absorber. Any near infrared black colorants produced by Fabri color, Eastman Kodak, or Yamamoto may be used. In some examples, the core or black fusing agent composition includes near infrared light absorber and an aqueous vehicle.

In some examples, the active material, or radiation absorbing agent, is a carbon back pigment or near infrared absorbing dyes. In some other examples, the active material, or radiation absorbing agent, is a carbon back pigment; and the core fusing agent composition may be an ink formulation including carbon black as the active material. Examples of this ink formulation are commercially known as CM997A, 5206458, C18928, C93848, C93808, or the like, all of which are available from HP Inc. In yet some other examples, the core fusing agent may be an ink formulation including near infrared absorbing dyes as the active material.

The core fusing agent composition is an aqueous formulation (i.e., includes a balance of water) that may also include any of the previously listed co-solvents, non-ionic surfactants, biocides, and/or anti-kogation agents. The core fusing agent composition includes an aqueous vehicle as defined above. In an example of the core fusing agent composition, the co-solvents are present in an amount ranging from about 1 wt % to about 60 wt % of the total wt % of the core fusing agent composition, the non-ionic surfactants are present in an amount ranging from about 0.5 wt. % to about 1.5 wt. % based on the total wt. % of the core fusing agent composition, the biocides are present in an amount ranging from about 0.1 wt. % to about 5 wt. % based on the total wt. % of the core fusing agent composition, and/or the anti-kogation agents are present in an amount ranging from about 0.1 wt. % to about 5 wt. % based on the total wt. % of the core fusing agent composition. Some examples of the core fusing agent composition may also include a pH adjuster, which is used to control the pH of the agent. From 0 wt % to about 2 wt % (of the total wt % of the core fusing agent) of the pH adjuster, for example, can be used.

The Colored Ink Composition

The colored ink composition 230 can include a colorant, a dispersant/dispersing additive, a co-solvent, and water. The colored ink composition 230 is a water-based inkjet composition. In some instances, the colored ink composition includes these components and no other components. In other instances, the colored ink composition may further include an anti-kogation agent, a biocide, a binder, and combinations thereof.

The colorant of the colored ink composition is a pigment and/or dye having a color other than white. Examples of the other colors include cyan, magenta, yellow, black, etc. In some instances, the colorant of the colored ink may also be transparent to infrared wavelengths. Examples of IR transparent colorants include acid yellow 23 (AY 23), AY17, acid red 52 (AR 52), AR 289, and reactive red 180 (RR 180). In other instances, the colorant of the colored ink composition may not be completely transparent to infrared wavelengths, but does not absorb enough radiation to sufficiently heat the build material particles in contact therewith. For example, the colorant of the colored ink composition may absorb some visible wavelengths and some IR wavelengths. Some examples of these colorants include cyan colorants, such as direct blue 199 (DB 199) and pigment blue 15:3 (PR 15:3).

The colored ink composition also includes the dispersing additive, which helps to uniformly distribute the colorant throughout the colored ink composition and aid in the wetting of the ink 230 onto the build material particles. Any of the dispersing additives discussed herein for the fusing agent may be used in the colored ink composition. The dispersing additive may be present in the colored ink composition in a similar amount as the colorant.

In addition to the non-white colorant and the dispersing additives, the colored ink composition may include similar components as the fusing agent (e.g., co-solvent(s), anti-kogation agent(s), biocide(s), water, etc.). The colored ink composition may also include a binder, such as an acrylic latex binder, which may be a copolymer of any two or more of styrene, acrylic acid, methacrylic acid, methyl methacrylate, ethyl methacrylate, and butyl methacrylate. Some examples of the colored ink composition may also include other additives, such as a humectant and lubricant (e.g., Liponic® EG-1 (LEG-1) from Lipo Chemicals), a chelating agent (e.g., disodium ethylene diamine-tetraacetic acid (EDTA-Na)), and/or a buffer.

An example of the pigment based colored ink composition may include from about 1 wt % to about 10 wt % of pigment(s), from about 10 wt % to about 30 wt % of co-solvent(s), from about 1 wt % to about 10 wt % of dispersing additive(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of the dye based colored ink composition may include from about 1 wt % to about 7 wt % of dye(s), from about 10 wt % to about 30 wt % of co-solvent(s), from about 1 wt % to about 7 wt % of dispersing additive(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

Some examples of the colored ink composition include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company. Other commercially available colored inks include C9384A (printhead HP 72), C9383A (printhead HP 72), C4901A (printhead HP 940), and C4900A (printhead HP 940).

The Build Material

The build material 206 are material particles and may be a polymeric build material. As used herein, the term "polymeric build material" may refer to crystalline or semi-crystalline polymer particles or composite particles made up of polymer and ceramic. Any of the particles may be in powder form. Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles include polyethylene, polypropylene, and polyoxomethylene (i.e., polyacetals). Still other examples of suitable build material particles include polystyrene, polycarbonate, polyester, polyurethanes, other engineering plastics, and blends of any two or more of the polymers listed herein.

The build material particles may have a melting point or softening point ranging from about 50° C. to about 400° C. As an example, the build material particles may be a polyamide having a melting point of 180° C. The build material particles may be made up of similarly sized particles or differently sized particles. The term "size", as used herein with regard to the build material particles, refers to the diameter of a spherical particle, or the average diameter of a non-spherical particle (i.e., the average of multiple diameters across the particle), or the volume-weighted mean diameter of a particle distribution. In an example, the average size of the build material particles ranges from 5 μm to about 200 μm.

Article Obtained According to the 3D Printing Method

Figure 6:
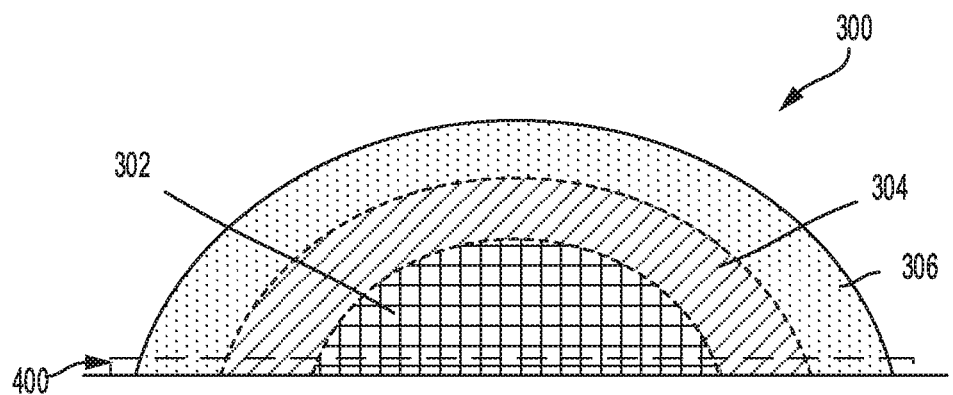
FIGS. 6 and 7 are a cross-sectional view of an example of a part and layer formed using example of the 3D printing method disclosed herein.

The present disclosure refers also to an article, or final 3D object, that has been obtained according to a three-dimensional printing method described herein. Such article is illustrated, as an example, in FIG. 6. FIG. 6 illustrates an example of a cross section of a printed article 300 resulting from the printing method described in the present disclosure.

The 3D printed article 300 comprises: a core substrate 302 made of a polymeric build material that has been fused with a core fusing agent composition; a first layer 304, applied on the surface of the core substrate 302, comprising a polymeric build material fused with a low tint fusing agent composition including metal oxide nanoparticles dispersed in a liquid vehicle or fused with core fusing agent; and a second layer 306, applied over the surface of the first layer, comprising a polymeric build material fused with a colored ink composition and with a low tint fusing agent. In some other examples, the 3D printed article 300 further comprises a third layer 308 applied over the surface of the second layer 306, comprising a colored ink composition. The third layer 308 is not illustrated in the FIG. 6 since it is an optional layer.

The core layer 302 might be considered as providing the mechanical integrity of the final 3D object. Due to the chemical nature of the core fusing agent it contains, the core layer might have a black color. The first layer 304 could be defined as a transition layer that would match lightness of the target color. The first layer 304 can provide the object with a white (or slightly tinted) exterior surface. The first layer 304 can also have the effect to optically isolate the core layer 302 that it covers. The second layer 306 and the third layer 308 (when present) would provide color to the final object and can also be thus referred to as the "colored layer". The color would be provided by the colorant contained in the ink composition.

It is to be understood that the final 3D object is made layer by layer, the layers are stacked over each other. i.e. by depositing one layer over the other. This means thus that the core layer (or substrate) 302 is not necessary built first, but the external layer, i.e. first 304 or second 306 layers, might be built first. The layer that is formed with the core fusing agent composition may be a first or primer layer (upon which other layers are formed) or may be an outer layer (or one of several layers forming an outer region) of the part that is formed.

The article of final 3D object is made several layers and each layer is made of several parts. Each layer is sequentially formed by selectively patterning respective build material layers with the core fusing agent or low tint fusing agent, depending of the nature of the part wanted, and exposing each patterned layer to electromagnetic radiation. In some examples, each layers 302, 304 and 306 would have a different but substantially uniform thickness. The core layer 302 would have a much larger size by comparison to the first layer 304 and second layer 306. In an example, the thickness of the first layer 304 and second layer 306 ranges from about 50 μm to about 300 μm, although thinner or thicker layers may also be used. In some other examples, the thickness of the core layer 302 ranges from about 500 μm to about 1 cm, although thinner or thicker layers may also be used.

Figure 7:
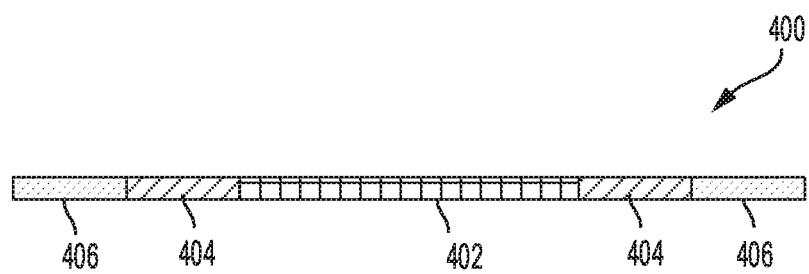

An example of a layer 400, formed by the 3D printing method disclosed herein, is illustrated in FIG. 6 and illustrated in more detail in FIG. 7. As used herein, the cross-section of the layer of the part to be formed refers to the cross-section that is parallel to the contact surface of the build area platform 202.

In some examples, the layer 400 is made of several parts of different nature. In some examples, the layer 400 will comprise a core part 402 made of core fusing agent composition and build material; a first part 404 made of low tint fusing agent and build material, a second part (or colored layer) 406 made of colored ink composition, low tint fusing agent and build material. Such examples parts, and thus the layer resulting from these parts, will be made in one single pass of the method, meaning thus that the low tint fusing agent composition, the core fusing agent composition and the colored ink composition will be applied simultaneously on different portion of the build material and then exposed to radiations in the same time.

It is to be understood that the different parts of the layers can be distributed differently, and that a layer does not necessarily comprises all parts of different natures but could also be made entirely of a core part made of core fusing agent composition and build material; or made of low tint fusing agent and build material or made of colored ink composition, low tint fusing agent and build material. The layer can also be made of any combination of the above. FIGS. 6 and 7 illustrate examples of the facts that one single layer is not made with one single component but is a combination of parts, made of the using of different fusing agents (core or low tint) and/or including colored ink composition each fused with build material, depending on where the layer will take place in the final 3D object. Without being bounded by any theory, the core layers/parts will provide mechanical integrity to the final 3D object while the first and second part (i.e. made with the low tint fusing agent) will provides a specific appearance, i.e. white or colored for examples.

In some examples, the 3D printed article 300 comprises a first layer 304, applied on the surface of the core substrate 302, comprising a polymeric build material fused with a low tint fusing agent composition including metal oxide nanoparticles dispersed in a liquid vehicle wherein the metal oxide nanoparticles have the formula (1) $M_mM'O_n$ wherein M is cesium (Cs), m is 0.33, M' is tungsten (W), and n is greater than 0 and less than or equal to 3. In some other examples, the low tint fusing agent composition includes a metal oxide nanoparticles having the formula (1) $M_mM'O_n$ wherein M is cesium (Cs), m is 0.33, M' is tungsten (W), and n is greater than 0 and less than or equal to 3. The core substrate 302 can comprises a core fusing agent composition that includes a radiation absorbing agent which is a carbon back pigment or near infrared absorbing dyes.

It is to be understood that the ranges provided herein include the stated range and any value or sub-range within the stated range. For example, a range from about 2 wt % to about 35 wt % should be interpreted to include not only the explicitly recited limits of from about 2 wt % to about 35 wt %, but also to include individual values, such as 3.35 wt %, 5.5 wt %, 17.75 wt %, 28.85 wt %, etc., and sub-ranges, such as from about 3.35 wt % to about 16.5 wt %, from about 2.5 wt % to about 27.7 wt %, etc. Furthermore, when "about" is utilized to describe a value, this is meant to encompass minor variations (up to +/−10%) from the stated value. Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. In describing and claiming the examples disclosed herein, the singular forms "a", "an", and "the" include plural referents unless the context clearly dictates otherwise.

The invention claimed is:

1. A three-dimensional printing method comprising:
   a. applying a build material;
   b. applying on, at least, a portion of the build material, a low tint fusing agent composition comprising metal oxide nanoparticles dispersed in a liquid vehicle, the metal oxide nanoparticles have the formula $M_mM'O_n$ wherein M is an alkali metal, m is greater than 0 and less than 1, M' is any metal, and n is greater than 0 and less than or equal to 4 and is dispersed in a liquid vehicle comprising a zwitterionic stabilizer;
   c. and exposing the build material to radiation to fuse the portion of the build material in contact with the low tint fusing agent composition to form a layer of a 3D object.

2. The three-dimensional printing method of claim 1 wherein a core fusing agent composition, comprising a radiation absorbing agent and an aqueous vehicle, is applied, simultaneously or subsequently, on at least another portion of the polymeric build material.

3. The three-dimensional printing method of claim 2 wherein a colored ink composition is applied simultaneously with the low tint fusing agent composition or/and with the core fusing agent composition.

4. The three-dimensional printing method of claim 1 further comprising applying a colored ink composition over the layer formed by the low tint fusing agent composition with the build material.

5. The three-dimensional printing method of claim 1 wherein, in the low tint fusing agent composition, the metal oxide nanoparticles has the formula $M_mM'O_n$ wherein M is cesium (Cs).

6. The three-dimensional printing method of claim 1 wherein, in the low tint fusing agent composition, the metal oxide nanoparticles has the formula $M_mM'O_n$ wherein M' is tungsten (W).

7. The three-dimensional printing method of claim 1 wherein, in the low tint fusing agent composition, the metal oxide nanoparticles has the formula $M_mM'O_n$ wherein M is cesium (Cs), m is 0.33, M' is tungsten (W), and n is greater than 0 and less than or equal to 3.

8. The three-dimensional printing method of claim 1 wherein in the low tint fusing agent composition, the zwitterionic stabilizer is selected from the group consisting of a $C_2$ to $C_8$ betaine, a $C_2$ to $C_8$ amino-carboxylic acid having a solubility of at least 10 g in 100 g of water, taurine, and combinations thereof.

9. The three-dimensional printing method of claim 2 wherein, in the core fusing agent composition, the radiation absorbing agent is a carbon black pigment or a near infrared absorbing dye.

10. The three-dimensional printing method of claim 3 wherein the colored ink composition includes a colorant, a dispersant/dispersing additive, a co-solvent, and water.

11. The three-dimensional printing method of claim 1, wherein the 3D object includes:
    a. a core substrate comprising a polymeric build material that has been fused with a core fusing agent composition;
    b. a first layer applied on the surface of the core substrate, the first layer comprising a polymeric build material fused with a low tint fusing agent composition including metal oxide nanoparticles dispersed in a liquid vehicle; and
    c. and a second layer applied over the surface of the first layer, the second layer comprising a polymeric build material fused with a colored ink composition and a core fusing agent composition or with a low tint fusing agent composition.

12. The three-dimensional printing method of claim 11 wherein, in the first layer, the low tint fusing agent composition that includes a metal oxide nanoparticles having the formula $M_mM'O_n$ wherein M is cesium (Cs), m is 0.33, M' is tungsten (W), and n is greater than 0 and less than or equal to 3.

13. The three-dimensional printing method of claim 11 wherein, in the second layer, the low tint fusing agent composition includes a metal oxide nanoparticles having the formula $M_mM'O_n$ wherein M is cesium (Cs), m is 0.33, M' is tungsten (W), and n is greater than 0 and less than or equal to 3.

14. The three-dimensional printing method of claim 11 wherein, in the low tint fusing agent composition, the metal oxide nanoparticles has the formula $M_mM'O_n$ wherein M is cesium (Cs).

15. The three-dimensional printing method of claim 11 wherein, in the low tint fusing agent composition, the metal oxide nanoparticles has the formula $M_mM'O_n$ wherein M' is tungsten (W).

16. The three-dimensional printing method of claim 11 wherein, in the second layer, the core fusing agent composition includes a radiation absorbing agent that is a carbon back pigment or near infrared absorbing dyes.

* * * * *